(12) United States Patent
Roberts et al.

(10) Patent No.: US 7,946,396 B2
(45) Date of Patent: May 24, 2011

(54) TWIN ROTOR DISC BRAKE

(75) Inventors: Paul Roberts, Newport (GB); Paul Anthony Thomas, Newport (GB); Alessandro Mortali, Toiho (IT); Shan Shih, Troy, MI (US); Martin Roche, Newport (GB); Corrado Conti, Novara (IT); Clive Harrup, Bedfordshire (GB); Marco Bassi, Novate Milanese (IT); Paul Hadley, South Wales (GB); Roberto Conti, Olona (IT); Jonathon Leslie Christopher Jackson, Herefordshire (GB); Gary Ganaway, Farmington Hills, MI (US)

(73) Assignee: Meritor Heavy Vehicle Braking Systems (UK) Limited, Gwent (GB)

( * ) Notice: Subject to any disclaimer, the term of this patent is extended or adjusted under 35 U.S.C. 154(b) by 1027 days.

(21) Appl. No.: 11/755,953

(22) Filed: May 31, 2007
(Under 37 CFR 1.47)

(65) Prior Publication Data
US 2008/0029352 A1   Feb. 7, 2008

(30) Foreign Application Priority Data
Jun. 2, 2006   (GB) .................................. 0610960.7

(51) Int. Cl.
*F16D 55/36* (2006.01)
(52) U.S. Cl. ........................ 188/71.5; 188/71.3; 188/72.7
(58) Field of Classification Search ................. 188/71.5, 188/72.7, 72.8, 71.3
See application file for complete search history.

(56) References Cited

U.S. PATENT DOCUMENTS

| | | | |
|---|---|---|---|
| 3,448,831 A | 6/1969 | Newstead | |
| 3,994,375 A | 11/1976 | Stritzel | |
| 4,234,061 A | 11/1980 | Margetts et al. | |
| 4,993,519 A * | 2/1991 | Thioux | 188/71.3 |
| 2005/0284709 A1* | 12/2005 | Sandberg | 188/72.1 |
| 2006/0049005 A1* | 3/2006 | Hendrich et al. | 188/71.5 |

FOREIGN PATENT DOCUMENTS

| | | |
|---|---|---|
| FR | 2837548 | 9/2003 |
| GB | 986400 | 3/1965 |
| JP | 10-331884 | 12/1998 |

OTHER PUBLICATIONS

United Kingdom Search Report dated Sep. 25, 2006.
Extended European Search Report dated Sep. 17, 2009.

* cited by examiner

*Primary Examiner* — Bradley T King
(74) *Attorney, Agent, or Firm* — Carlson, Gaskey & Olds, P.C.

(57) ABSTRACT

A caliper for a fixed twin rotor disc brake includes a relatively fixed body, two yokes movable axially with respect to the body, formations defined on the yokes for receiving four brake pads for respective application to rotor sides, and an actuator adapted to urge the yokes relatively axially. One of the yokes is operable to urge two of the four brake pads in a first axial direction, the other of the yokes is operable to urge the other two of the four brake pads in a second, opposite axial direction. The four brake pads are positioned on a first side of the actuator in the first axial direction.

12 Claims, 1 Drawing Sheet

TWIN ROTOR DISC BRAKE

REFERENCE TO RELATED APPLICATIONS

This application claims priority to United Kingdom Patent Application GB 0610960.7 filed on Jun. 2, 2006.

BACKGROUND OF THE INVENTION

This invention relates generally to a twin rotor disc brake primarily, but not exclusively, for heavy commercial vehicles.

Disc brakes include a rotor having opposite annular faces to which brake pads are applied by a caliper. Hydraulic actuation is generally provided in passenger and light commercial vehicles, and the brake pads are applied to the rotor by opposed pistons of the caliper, or by a single piston caliper having a sliding yoke. Heavy commercial vehicles rely upon air actuation, which necessarily requires a relatively large air actuator.

Disc brakes are preferred over drum brakes because of their increased performance and ease of inspection and maintenance. However, a rotor diameter is generally restricted by a vehicle wheel diameter, and in some cases a swept area of the rotor may be insufficient for the weight of the vehicle. Accordingly, twin rotor disc brakes have been developed, but in order to use a single caliper, one or both of the rotors must slide axially relative to the axle, for example on splines. This arrangement is not wholly satisfactory because sliding splines are relatively expensive to manufacture and have a tendency to stick due to corrosion or an accumulation of dirt and brake pad residues. Multiple calipers are not practicable. It would be desirable to provide a single caliper, twin rotor disc brake in which the rotors are relatively fixed, but the caliper has a single actuator.

A further problem of twin rotor disc brakes is that they are generally mounted at axle ends, and in use at least partially shrouded by the wheel. Accordingly, removal of the wheel is necessary for inspection and replacement of the brake pads and/or the rotors. Frequently brake pad wear is uneven so that semi-worn brake pads are replaced at the same time as fully worn pads in order to avoid an intermediate inspection. It would be desirable to equalize brake pad wear and to provide a way of actuation suitable for mid-axle location, where appropriate. Such an arrangement would be especially useful in undriven rigid axles of e.g., semi-trailers, so that unnecessary wheel removal is avoided. Generally speaking, wheel removal should be avoided if possible because of the well known problem of settling of freshly tightened wheel nuts, which can lead to loosening of the nuts and wheel shedding.

SUMMARY OF THE INVENTION

According to a first aspect of the invention, there is provided a caliper for a fixed twin rotor disc brake. The caliper includes a relatively fixed body, two yokes movable axially with respect to the body, formations defined on the yokes for receiving four brake pads for respective application to rotor sides and an actuator adapted to urge the yokes relatively axially. One of the yokes is operable to urge two of the four brake pads in a first axial direction, and the other of the yokes is operable to urge the other two of the four brake pads in a second, opposite axial direction. The four brake pads are positioned on a first side of the actuator in the first axial direction.

According to a second aspect of the invention, there is provided a caliper for a fixed twin rotor disc brake. The caliper includes a relatively fixed body, a first yoke moveable axially with respect to the body, and a second yoke moveable axially with respect to the body. The first yoke has formations for receiving a first pair of brake pads for application to rotor sides. The first yoke further includes a first leg connecting the formations for receiving each of the first pair of brake pads. The second yoke has formations defined thereon for receiving a second pair of brake pads for application to the rotor sides and a second leg connecting the formations for receiving each of the second pair of brake pads. The first yoke is operable to urge the first pair of brake pads in a first axial direction, and the second yoke is operable to move the second pair of brake pads in a second, opposite axial direction. The first leg and the second leg move in substantially the same plane.

Such an arrangement combines the reliability of a fixed rotor installation with the simplicity of a single actuator operable on both yokes at the same time. This latter feature ensures equalization of brake pad wear between pad pairs. The actuator acts directly on each yoke, and in one embodiment in a common plane.

In one example, the actuator floats with respect to the body, thus permitting the wear of the two brake pad pairs to be equalized. In one embodiment, the actuator is substantially midway between the rotors, and the yokes are identical. In another embodiment, the actuator is inboard of the rotor pair.

In one embodiment, the yokes overlap. The yokes include oppositely facing 'U' shaped members defining an aperture between the members, the actuator being provided in the aperture and operable to urge the members apart. The yokes may have mutually engaging sliding surfaces such that one yoke may be supported in part on the body via the other. Each yoke may include both a supporting portion for the other yoke, and a portion which is supported on the other yoke.

The actuator may be a cam pivotable about a radius of the axis of rotation of the axle. The cam is preferably symmetrical and in one embodiment is oval. Cams pivotable about the other axes are possible, provided that the effect is to urge the members equally apart.

In place of a cam, the actuator may include a pneumatic jack or any other feature capable of extension on operation thereof.

BRIEF DESCRIPTION OF THE DRAWINGS

One feature of the invention will be apparent from the following description of preferred embodiments shown by way of example only in the accompanying drawings in which.

DETAILED DESCRIPTION OF THE PREFERRED EMBODIMENT

Figure 1:
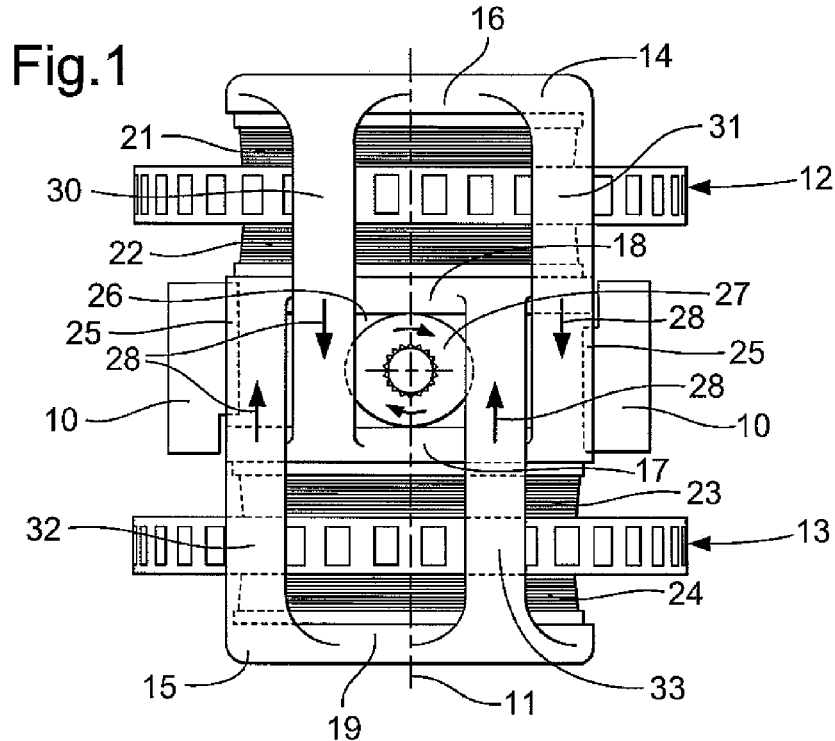
FIG. 1 is a plan schematic view of a first embodiment of the invention.

With reference to FIG. 1, a caliper body 10 is mounted by any suitable manner on a fixed element of a vehicle axle having an axis of rotation 11. Twin rotors 12 and 13 are attached to a rotating element of the axle, such as a hub, by any suitable conventional method. The rotors 12 and 13 may include a single component or a unitary assembly. In the embodiment shown, the rotors 12 and 13 are ventilated, however ventilation of the rotors 12 and 13 may not always be necessary.

Two overlapping yokes 14 and 15 are provided, one yoke 14 and 15 straddling a respective rotor 12 and 13. The yoke 14 has two depending arms 16 and 17, and the yoke 15 has two depending arms 18 and 19. The four depending arms 16, 17, 18 and 19 are each applied to the backplate of the four brake pads 21, 23, 22 and 24, respectively, as illustrated. The depending arms 16 and 17 are connected by a pair of connecting legs 30 and 31 to hold them a set distance apart. Similarly, the depending arms 18 and 19 are connected by a pair of connecting legs 32 and 33. The connecting legs 30, 31, 32, 33 are offset relative to each other and move relative to each other in the same plane such that the yokes 14 and 15, when assembled, only have the height of a single yoke; i.e., they are side-by-side and co-planar. This arrangement is possible by ensuring that the depending arm 18 is positioned below the parallel connecting legs 30 and 31, and the depending arm 17 is positioned below the parallel connecting legs 32 and 33. Alternatively, grooves or indentations may be provided on the depending arms 17 and 18 to slideably receive the connecting legs 30, 31, 32 and 33.

The arrangement provides that the depending arms 16, 17, 18 and 19 of each yoke 14 and 15 are associated with one brake pad 21, 22, 23 and 24 of each rotor 12 and 13. Thus, the depending arms 16 and 17 are associated with the brake pads 21 and 23, and the depending arms 18 and 19 are associated with the brake pads 22 and 24.

The yokes 14 and 15 are slidable in the direction of the axis of rotation 11 with respect to each other and to the caliper body 10. Suitable sliding arrangements are provided, such as key and keyway elements 25, but any suitable conventional method may be used, including cylindrical pins and corresponding apertures. As with all kinds of sliding calipers, the intent is that only relative movement in the direction of the axis of rotation 11 is permitted. Relative arcuate movement is, of course, prevented to allow grounding of the braking torque via the caliper body 10.

The yokes 14 and 15 are generally rectangular in plan and overlap to define an aperture 26 centered between the rotors 12 and 13. An oval cam 27 is provided in the aperture 26 and is rotatable about the caliper body 10 to increase the yoke 14 and 15 overlap, or permit a reduction in the yoke 14 and 15 overlap. As illustrated, the cam 27 is rotatable about an axis radial of the axis of rotation 11, but a cam 27 rotatable about an axis orthogonal to a radius could also be employed.

In use, rotation of the cam 27 is effected by any suitable actuation mechanism, including, for example, mechanical, electrical, hydraulic or pneumatic systems. Rotation in either direction causes the yokes 14 and 15 to be urged, respectively, in the direction of arrows 28, thus applying the brake pads 21, 22, 23 and 24 to the rotors 12 and 13. The yoke 14 applies the brake pads 21 and 23 in one axial direction, whereas the yoke 15 applies the brake pads 22 and 24 in the other axial direction.

The brake pads 21, 22, 23 and 24 associated with each yoke 14 and 15 will wear equally, and any uneven wear of one brake pad is immediately compensated by a greater braking effort being generated at the other brake pad.

The cam 27 may be fixed with respect to its rotational axis or be allowed to float relative to the rotary axis. The latter is preferable to equalize braking effort exerted by each yoke 14 and 15.

Reverse rotation of the cam 27 allows the brake pads 21, 22, 23 and 24 to push the yokes 14 and 15 back to the released condition. Return springs are not usually necessary because a light rubbing contact of the brake pad 21, 22, 23 and 24 and the disc is generally beneficial. However, such spring(s) can be provided if required in any convenient location.

In the embodiment shown in FIG. 1, the yokes 14 and 15 are identical and reversible. This reduces manufacturing and stockholding costs. Furthermore, the yokes 14 and 15 may be adapted to engage each other via sliding overlapping surfaces to provide mutual support. The yoke 14 and 15 pair of FIG. 1 can be manufactured for assembly by slotting the outboard arm of one or both yokes 14 and 15. Alternatively, one or both yokes 14 and 15 may be assembled from a number of subassemblies.

Figure 2:
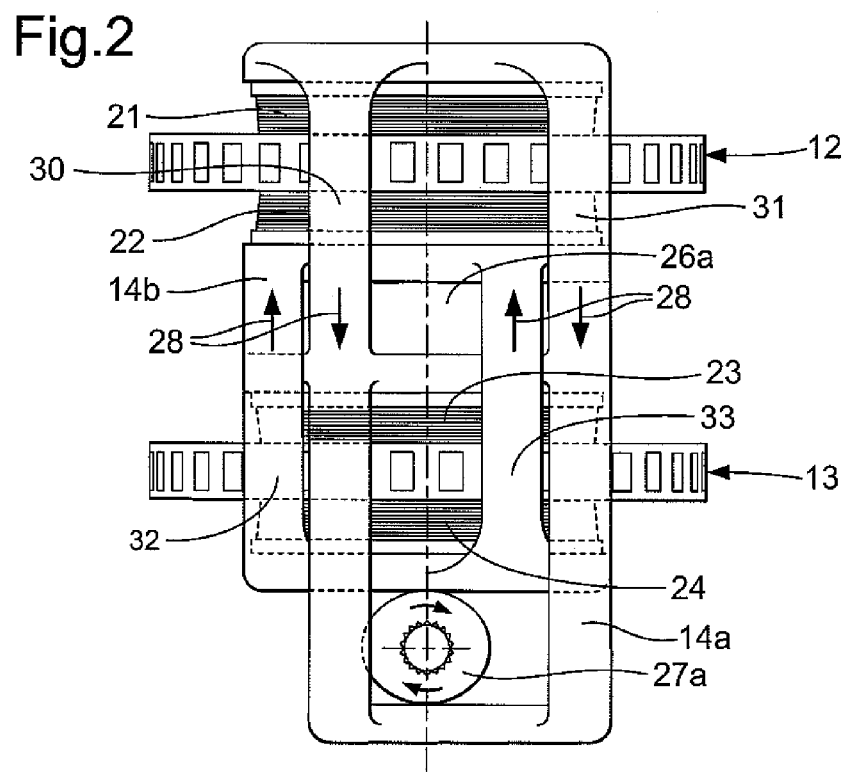
FIG. 2 is a plan schematic view of a second embodiment of the invention.

An alternative asymmetric form of the invention is illustrated in FIG. 2. The method of operation is identical, but one of the yokes 14a is extended axially to overlap the other yoke 14b at both sides. The additional overlap allows the cam 27a to be located at an inboard side rather than in the center. An advantage of this arrangement is that the rotors 12 and 13 are closer together and can in fact be much closer than illustrated if a central aperture 26a is minimized for unworn brake pads. This arrangement is especially suitable for an axle end location and permits the wheel(s) to overlap both of the rotors 12 and 13, while allowing the actuator to protrude at the inboard side where connection to the actuation system may be facilitated.

The invention is especially suitable for undriven rigid axles, such as those of semi-trailers. The twin rotor arrangement can be mounted inboard of the wheels and may even be provided at the center of the axle if respective rotors provide the braking to respective axle ends. The arrangement equalizes pad wear and allows for rapid routine inspection, while leaving the wheels in place.

In an alternative embodiment, the caliper body 10 of FIG. 1 could extend to one or both of the depending arms 19 and 16, with an abutment defined thereon to act as a load path for the drag load experienced by the depending arms 19 and 16. This will advantageously reduce the torque produced at the position where the yokes 14 and 15 are mounted to the caliper body 10.

The brake pads 21, 22, 23 and 24 may be mounted to the yokes 14 and 15 in a number of ways, for example by mechanical fasteners, or by abutment with sidewalls of a recess in the yoke surface facing the rotor 12 and 13. Additionally, the connecting legs 30, 31, 32 and 33 may be positioned sufficiently apart such that the brake pads 21, 22, 23 and 24 can be inserted and removed therebetween for replacement.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A caliper for a fixed twin rotor disc brake, the caliper comprising:
   a relatively fixed body;
   a first yoke moveable axially with respect to the relatively fixed body, the first yoke having a first depending arm and a second depending arm comprising first formations for receiving a first pair of brake pads, the first yoke further including a first connecting leg and a second connecting leg connecting the depending arms; and
   a second yoke moveable axially with respect to the relatively fixed body, the second yoke having a first depending arm and a second depending arm comprising second formations for receiving a second pair of brake pads, the second yoke further including a first connecting leg and a second connecting leg connecting the depending arms,
   wherein the first yoke is operable to urge the first pair of brake pads in a first axial direction, the second yoke is operable to move the second pair of brake pads in a second, opposite axial direction, and the first leg and the second leg move in substantially the same plane, and wherein the yokes overlap such that the first depending arm of the second yoke is positioned below the connecting legs of the first yoke, and the second depending arm of the first yoke is positioned below the connecting legs of the second yoke.

2. The caliper according to claim 1 wherein the first formations for receiving the first pair of brake pads and the second formations for receiving the second pair of brake pads are fitted on a first side of the actuator in the first axial direction.

3. The caliper according to claim 1 wherein the actuator acts directly on each of the first yoke and the second yoke.

4. The caliper according to claim 3 wherein the actuator acts on each of the first yoke and the second yoke in a common plane.

5. The caliper according to claim 1 wherein the actuator floats with respect to the relatively fixed body.

6. The caliper according to claim 1 wherein the actuator is inboard a pair of rotors.

7. The caliper according to claim 1 wherein the actuator is a cam pivotable about an axis perpendicular to the first axial direction and the second, opposite axial direction.

8. The caliper according to claim 1 further including a brake pad mounted in at least one of the first formations and the second formations for receiving the first pair of brake pads and the second pair of brake pads, respectively.

9. The caliper according to claim 1 wherein the first yoke and the second yoke are substantially identical.

10. The caliper according to claim 1 wherein the first yoke and the second yoke are reversible.

11. The caliper according to claim 1 wherein the depending arms of one of the yokes include a groove to slidably receive one of the connecting legs of the other of the yokes.

12. A twin rotor disc brake comprising:
two rotors having a relatively fixed axial location; and
a caliper for the twin rotor disc brake straddling the twin rotors, the caliper comprising:
  a relatively fixed body,
  a first yoke moveable axially with respect to the relatively fixed body, the first yoke having a first depending arm and a second depending arm comprising first formations for receiving a first pair of brake pads, the first yoke further including a first connecting leg and a second connecting leg connecting the depending arms, and
  a second yoke moveable axially with respect to the relatively fixed body, the second yoke having a first depending arm and a second depending arm comprising second formations for receiving a second pair of brake pads, the second yoke further including a first connecting leg and a second connecting leg connecting the depending arms,
  wherein the first yoke is operable to urge the first pair of brake pads in a first axial direction, the second yoke is operable to move the second pair of brake pads in a second, opposite axial direction, and the first leg and the second leg move in substantially the same plane, and
wherein the yokes overlap such that the first depending arm of the second yoke is positioned below the connecting legs of the first yoke, and the second depending arm of the first yoke is positioned below the connecting legs of the second yoke.

* * * * *